United States Patent
Delpy et al.

(10) Patent No.: US 12,292,137 B2
(45) Date of Patent: May 6, 2025

(54) AIRCRAFT DRAINAGE VALVE, TOOL FOR CHECKING THE CORRECT OPERATION OF SAID DRAINAGE VALVE AND METHOD FOR CHECKING THE OPERATION OF SAID DRAINAGE VALVE USING SAID CHECKING TOOL

(71) Applicant: Airbus Operations SAS, Toulouse (FR)

(72) Inventors: Vincent Delpy, Toulouse (FR); Gérard Millet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 263 days.

(21) Appl. No.: 17/967,952

(22) Filed: Oct. 18, 2022

(65) Prior Publication Data
US 2023/0133758 A1 May 4, 2023

(30) Foreign Application Priority Data
Oct. 29, 2021 (FR) ...................................... 2111533

(51) Int. Cl.
*B64F 5/60* (2017.01)
*F16K 24/04* (2006.01)
*F16K 37/00* (2006.01)

(52) U.S. Cl.
CPC ............ *F16K 37/0083* (2013.01); *B64F 5/60* (2017.01); *F16K 24/04* (2013.01)

(58) Field of Classification Search
CPC .. F16K 37/0083; F16K 24/04; F16K 17/0486; B64F 5/60; B64F 5/40; B64C 1/1453
See application file for complete search history.

(56) References Cited

U.S. PATENT DOCUMENTS

| | | |
|---|---|---|
| 2,840,894 A | 7/1958 | Eckler et al. |
| 3,252,210 A | 5/1966 | Bowden |
| 4,463,774 A | 8/1984 | Gorges et al. |
| 5,165,156 A | 11/1992 | Shultz |
| 5,285,636 A | 2/1994 | Mayo et al. |
| 2021/0039803 A1* | 2/2021 | Barnes ...................... B64F 5/40 |

FOREIGN PATENT DOCUMENTS

CN 104482280 B 9/2016

OTHER PUBLICATIONS

French Search Report dated Jun. 14, 2022; priority document.

* cited by examiner

*Primary Examiner* — David J Bolduc
(74) *Attorney, Agent, or Firm* — Greer, Burns & Crain, Ltd.

(57) ABSTRACT

A drainage valve comprising a through hole, a seat around the through hole, a shutter comprising an end face and movable in a longitudinal direction between a first position in which the end face of the shutter is away from the seat and a second position in which the end face of the shutter is pressed against the seat and blocks the through hole, and an elastic element configured to keep the shutter in the first position. The shutter has a recess, emerging at its end face, configured to introduce therein a part of a tool in order to temporarily secure the part of the tool and the shutter in order to displace it in two directions longitudinally.

9 Claims, 2 Drawing Sheets

AIRCRAFT DRAINAGE VALVE, TOOL FOR CHECKING THE CORRECT OPERATION OF SAID DRAINAGE VALVE AND METHOD FOR CHECKING THE OPERATION OF SAID DRAINAGE VALVE USING SAID CHECKING TOOL

CROSS-REFERENCES TO RELATED APPLICATIONS

This application claims the benefit of the French patent application No. 2111533 filed on Oct. 29, 2021, the entire disclosures of which are incorporated herein by way of reference.

FIELD OF THE INVENTION

The present application relates to an aircraft drainage valve, to a tool for checking the correct operation of the drainage valve and to a method for checking the operation of the drainage valve using the checking tool.

BACKGROUND OF THE INVENTION

According to an embodiment visible in FIG. 1, the cell 10 of an aircraft comprises, among other things, a fuselage 12, an airfoil 14 and a tail unit 16. The cell 10 of an aircraft comprises at least one drainage valve 18, illustrated in detail in FIGS. 2 and 3, positioned at a low point of the cell 10 to discharge fluids out of the cell 10.

The cell 10 has an internal pressure substantially equal to the external pressure, when the aircraft is on the ground. When the aircraft is in flight, the internal pressure of the cell 10 is greater than the external pressure and the differential between the internal and external pressures increases as a function of the altitude of the aircraft.

The drainage valve 18 is configured to occupy an open state, visible in FIG. 2, allowing the discharging of the fluids, more particularly the discharging of the liquids 20 by gravity, when the aircraft is on the ground or the differential between the internal and external pressures is below a given threshold, and a closed state, as illustrated in FIG. 3, preventing the flow of the fluids out of the aircraft when the latter is in flight and the differential between the internal and external pressures is above or equal to the given threshold.

According to one embodiment, the drainage valve 18 is positioned in line with an orifice 22.1 of a wall 22 of the cell 10 allowing the inside and the outside of the cell 10 to be connected. This drainage valve 18 comprises:

a support 24 configured to be fixed against the inner face of the wall 22 of the cell 10, all around the orifice 22.1, a ring 26 positioned at the orifice 22.1 having a through hole 28, a shutter 30 that is movable between a first position, corresponding to the open state, in which it is away from the ring 26 and allows the flow of the fluids via the through hole 28 and a second position, corresponding to the closed state, in which it is pressed against the ring 26 and blocks the through hole 28, a spring 32 configured to keep the shutter 30 in the first position as long as the differential between the internal and external pressures is below the given threshold.

Thus, as illustrated in FIG. 2, when the differential between the internal and external pressures is below the given threshold, the aircraft being on the ground for example, the spring 32 keeps the shutter 30 away from the ring 26, notably allowing the liquids 20 to flow by gravity via the through hole 28 out of the cell 10.

As illustrated in FIG. 3, in flight, from a certain altitude, the differential between the internal and external pressures becomes greater than or equal to the given threshold. Consequently, the pressure inside the cell 10 is sufficient to push the shutter 30, working against the spring 32, against the ring 26 in order to block the through hole 28 and prohibit any flow of fluids out of the cell 10 via the through hole 28.

The correct operation of this drainage valve 18 is regularly checked. As illustrated in FIG. 4, when the shutter 30 is blocked in the second position, corresponding to the closed state, while the differential between the internal and external pressures is below the given threshold, it is possible to unblock the shutter 30, by pushing it with a rod 34 introduced via the through hole 28.

On the other hand, if the shutter 30 is blocked in the first position, for example because of being parked for a long time on the ground, it is difficult to check that it is operating correctly or to unblock it, access to the drainage valve 18 being difficult, even impossible, from the inside of the cell 10.

The present invention aims to remedy all or part of the drawbacks of the prior art.

SUMMARY OF THE INVENTION

To this end, a subject of the invention is a drainage valve comprising:

a support configured to be fixed against an inner face of a wall in line with an orifice passing through the wall, a ring having a through hole and a seat around the through hole, configured to be positioned at the orifice, a shutter comprising an end face delimited by a peripheral edge, the shutter being movable in a longitudinal direction between a first position in which the end face of the shutter is away from the seat of the ring and a second position in which the end face of the shutter is pressed against the seat of the ring and blocks the through hole, an elastic element configured to keep the shutter in the first position as long as a differential between pressures on either side of the wall is below a given threshold.

According to the invention, the shutter has a cylindrical body and a recess emerging at its end face, the recess being spaced apart from the peripheral edge over the entire circumference of the peripheral edge, the recess comprising a lateral wall that is cylindrical and substantially coaxial to the cylindrical body of the shutter.

Thus, it is possible to introduce into the recess of the shutter a part of a tool and to temporarily secure the part of the tool and the shutter in order to displace it in two opposite directions longitudinally.

According to another feature, the recess comprises a counterbore, away from the end face, which has a diameter greater than that of the lateral wall of the recess.

Also, a subject of the invention is a tool for checking the operation of a drainage valve according to one of the preceding features. This checking tool comprises a stem which extends between first and second ends, at least one expandable element positioned at the first end of the stem and configured to occupy a retracted state in which the expandable element can be inserted into the recess, and a deployed state in which the expandable element cooperates with the recess and makes it possible to temporarily link the stem and the shutter to displace it in two opposite directions longitudinally, and a control configured to switch the expandable element from the retracted state to the deployed state or vice versa.

According to another feature, the stem has a longitudinal axis linking its first and second ends. In addition, the expandable element comprises at least two arms each having a first end linked to the stem by an articulation and a free second end, each articulation comprising a pivoting axis at right angles to the longitudinal axis and spaced apart therefrom, the pivoting axes of the arms being distributed about the longitudinal axis such that the arms pivot in planes passing through the longitudinal axis and evenly distributed about the latter.

According to another feature, each arm comprises, at its free second end, a block configured to cooperate with a counterbore of the recess of the shutter.

According to another feature, the control is positioned at the second end of the stem.

According to another feature, the stem is hollow. In addition, the control comprises a rod sliding in the stem and having a first end linked to the arms and a grippable second end protruding from the second end of the stem.

According to another feature, the second end of the rod comprises a head.

Also, a subject of the invention is a method for checking the operation of a drainage valve by using a checking tool according to one of the preceding features. This checking method comprises a step of insertion of the expandable element of the checking tool in the retracted state into the recess of the shutter, a step of activation of the control to switch the expandable element to the deployed state, a step of verification of the operation and/or of unblocking of the drainage valve by displacing the checking tool parallel to the longitudinal direction in two opposite directions, a step of deactivation of the control to switch the expandable element from the deployed state to the retracted state and then a step of removal of the expandable element from the recess.

BRIEF DESCRIPTION OF THE DRAWINGS

Other features and advantages will emerge from the following description of the invention, a description given purely by way of example, in light of the attached drawings in which.

DETAILED DESCRIPTION OF THE PREFERRED EMBODIMENTS

Figure 1:
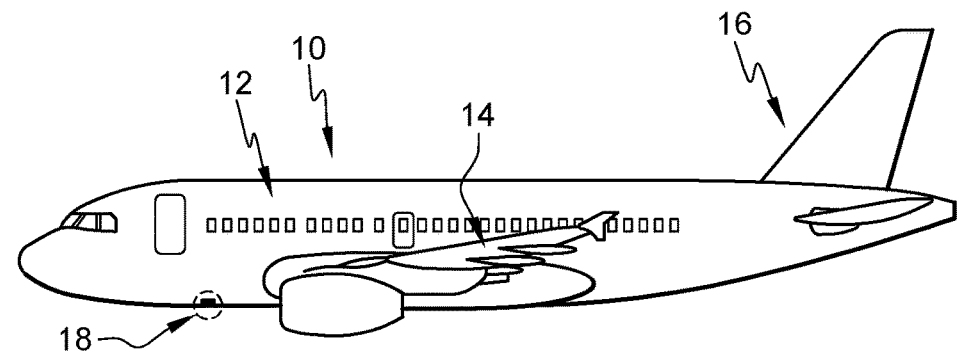
FIG. 1 is a side view of an aircraft.
Figure 2:
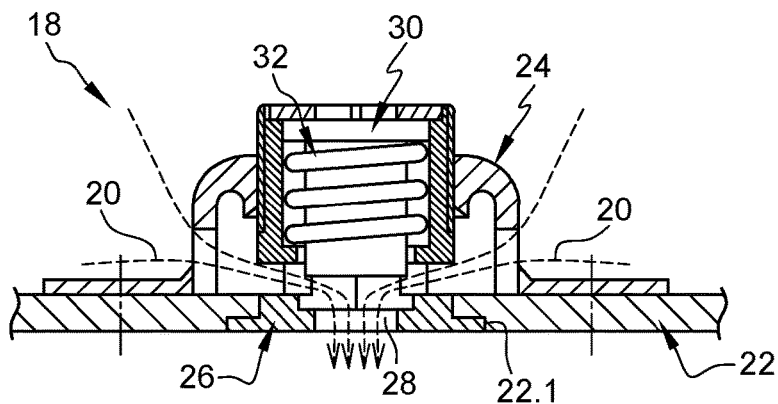
FIG. 2 is a longitudinal cross section of a drainage valve illustrating an embodiment of the prior art in the open state.
Figure 3:
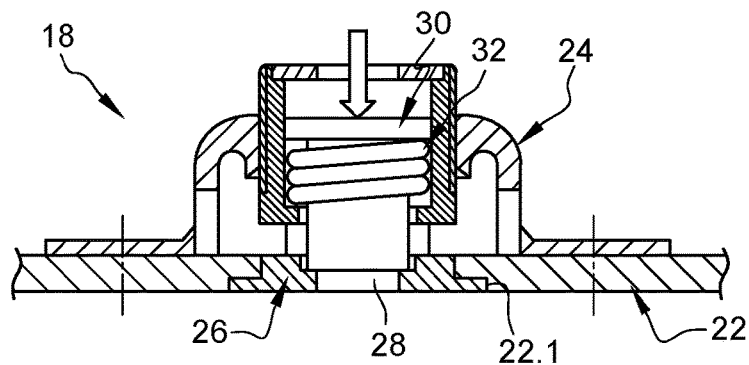
FIG. 3 is a longitudinal cross section of the drainage valve visible in FIG. 2 in the closed state.
Figure 4:
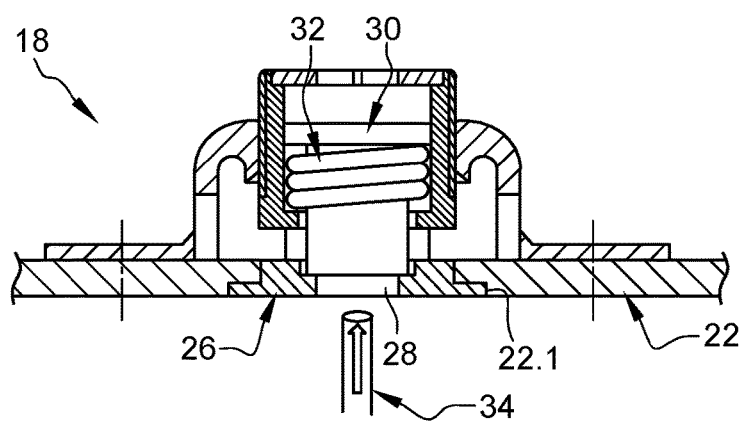
FIG. 4 is a longitudinal cross section of the drainage valve visible in FIG. 2, its shutter being blocked in a position corresponding to the closed state.
Figure 5:
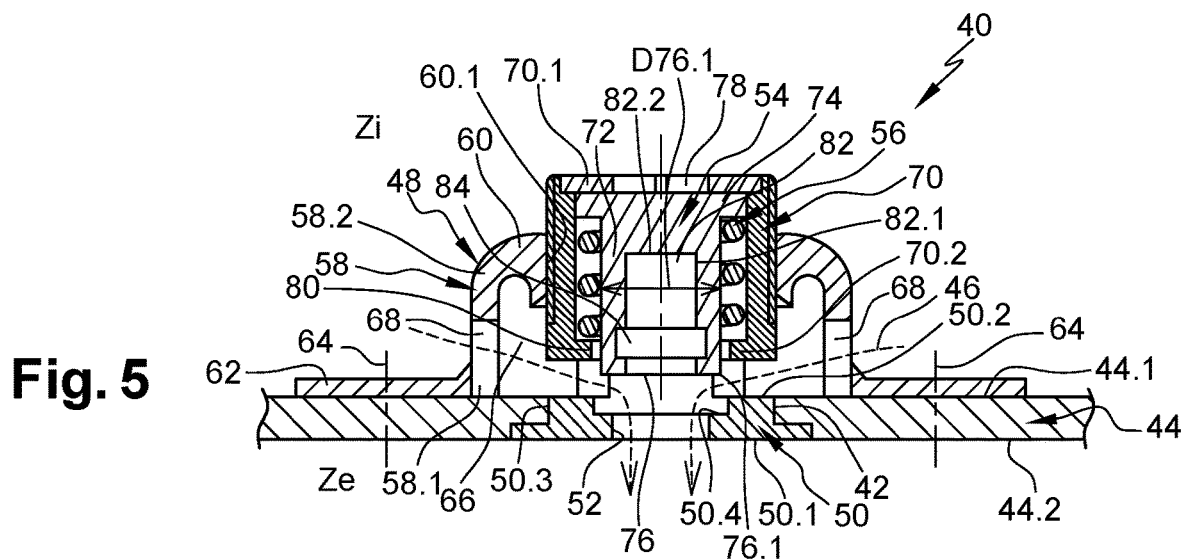
FIG. 5 is a longitudinal cross section of a drainage valve illustrating an embodiment of the invention in the open state.
Figure 7:
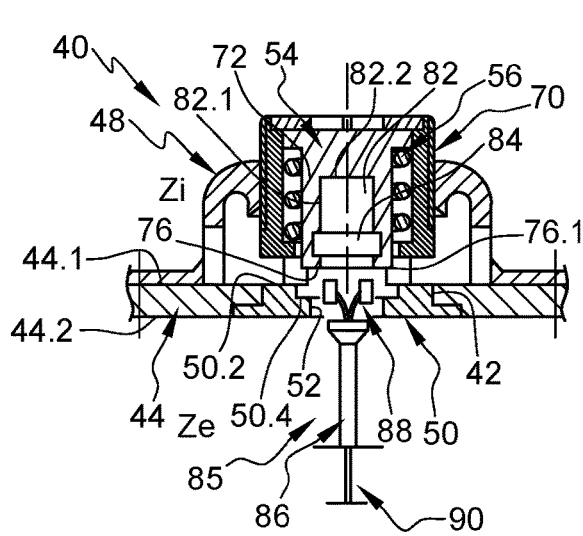
FIG. 7 is a schematic representation of the checking tool in the retracted state upon its insertion into the drainage valve.
Figure 8:
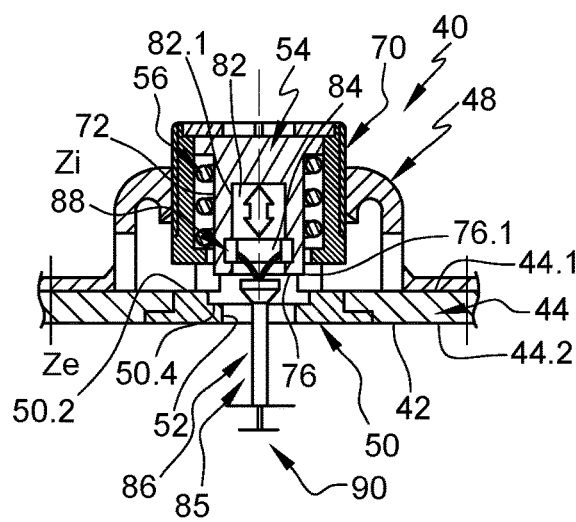
FIG. 8 is a schematic representation of the checking tool in the deployed state when checking the correct operation of the drainage valve.

In FIGS. 5, 7 and 8, a drainage valve 40 is represented positioned at an orifice 42 passing through a wall 44.

According to one application, the wall 44 is a wall of a cell of an aircraft, like the fuselage of an aircraft for example, and the orifice 42 is positioned at a low point of the cell of the aircraft.

The wall 44 has an inner face 44.1 oriented toward an internal zone Zi and an outer face 44.2 (opposite the inner face 44.1) oriented toward an external zone Ze. In operation, the internal zone Zi has an internal pressure and the external zone Ze an external pressure. When the aircraft is on the ground, the internal and external pressures are substantially equal. In flight, the internal and external pressures have a non-zero differential which varies notably as a function of the altitude.

In operation, at least one liquid 46 can accumulate, in the internal zone Zi, against the inner face 44.1 of the wall 44, at the low point. This liquid 46 must be discharged to the external zone Ze.

Hereinafter in the description, a liquid will be understood to mean a liquid or a mixture of several liquids.

A longitudinal direction corresponds to a direction at right angles to the wall 44 passing through the center of the orifice 42. A longitudinal plane is a plane containing the longitudinal direction.

The drainage valve 40 is configured to occupy an open state, visible in FIG. 5, allowing the discharging of the fluids, more particularly the discharging of the liquid 46 by gravity, from the internal zone Zi to the external zone Ze when the differential between the internal and external pressures is below a given threshold, and a closed state preventing the flow of the fluids to the external zone Ze when the differential between the internal and external pressures is above or equal to the given threshold.

According to one embodiment, the drainage valve 40 comprises:

a support 48 configured to be fixed against the inner face 44.1 of the wall 44, all around the orifice 42, a ring 50 positioned at the orifice 42 having a through hole 52, a shutter 54 that is mobile longitudinally between a first position, corresponding to the open state, in which the shutter 54 is away from the ring 50 and allows a flow of the liquid 46 via the through hole 52 and a second position, corresponding to the closed state, in which the shutter 54 is pressed against the ring 50 and blocks the through hole 52, an elastic element 56, like a spring for example, configured to keep the shutter 54 in the first position as long as the differential between the internal and external pressures is below the given threshold.

The support 48 comprises a tubular wall 58 which extends between first and second ends 58.1, 58.2, a transverse wall 60 positioned at the second end 58.2, and a flange ring 62 positioned at the first end 58.1 of the tubular wall 58, all around the tubular wall 58. The tubular and transverse walls 58, 60 and the flange ring 62 form one and the same part.

In operation, the flange ring 62 is pressed against the inner face 44.1 of the wall 44 and secured to the latter by link elements 64.

When the support 48 is linked to the wall 44, the tubular and transverse walls 58, 60 delimit a cavity 66. The tubular wall 58 has at least one lateral orifice 68 configured to connect to the internal zone Zi and the cavity 66. According to one configuration, the tubular wall 58 is cylindrical and has several lateral orifices 68 distributed over its circumference and juxtaposed with the flange ring 62.

The transverse wall 60 has a through hole 60.1, substantially coaxial to the tubular wall 58.

The support 48 also comprises a cylindrical recess 70 that is closed at a first end by a first end wall 70.1 positioned outside of the cavity 66 and at a second end by a second end wall 70.2 positioned in the cavity 66. The cylindrical recess 70 has an external diameter substantially equal to the diameter of the through hole 60.1 of the transverse wall 60. According to a first configuration, the cylindrical recess 70 is fixed with respect to the transverse wall 60. According to this first configuration, the cylindrical recess 70 and the transverse wall 60 could form only one and the same part.

According to a second configuration, the cylindrical recess 70 is movable with respect to the transverse wall 60 and linked to the latter by a screw pitch, as illustrated in FIG. 5. According to this second configuration, the cylindrical recess 70 can be translated longitudinally with respect to the transverse wall 60 by screwing it in more or less. This configuration makes it possible to correctly position the ring 50 with respect to the outer face 44.2 of the wall 44.

The ring 50 has a first face 50.1 oriented toward the external zone Ze, a second face 50.2 oriented toward the cavity 66 and parallel to the first face 50.1, and a peripheral face 50.3 linking the first and second faces 50.1, 50.2 having a diameter fitted to that of the orifice 42 passing through the wall 44. In operation, the first face 50.1 is flush with the outer face 44.2 of the wall 44.

The through hole 52 links the first and second faces 50.1, 50.2 and is substantially coaxial to the peripheral face 50.3. According to one configuration, the ring 50 comprises a countersink 50.4 on the second face 50.2, coaxial to the through hole 52. Whatever the embodiment, the ring 50 comprises a seat around the through hole 52 formed by the second face 50.2 and/or the countersink 50.4.

The ring 50 is linked to the cylindrical recess 70 in such a way that the through hole 52 is substantially coaxial to the cylindrical recess 70, the second face 50.2 of the ring 50 and the second end wall 70.2 of the cylindrical recess 70 being spaced apart from one another so as to allow a liquid 46 to flow by gravity from the cavity 66 to the through hole 52.

The shutter 54 comprises a cylindrical body 72 which extends between a first end oriented toward the ring 50 and a second end, and a head 74 in the form of a disk, secured to the second end of the cylindrical body 72 and substantially coaxial to the cylindrical body 72. The head 74 of the shutter 54 has a diameter substantially equal to or very slightly less than the internal diameter of the cylindrical recess 70. Thus, the shutter 54 forms a piston sliding in the cylindrical recess 70. The first end of the cylindrical body 72 forms an end face 76 that is flat and at right angles to the axis of the cylindrical body 72. The end face 76 is delimited by a peripheral edge 76.1 having a diameter D76.1 greater than the diameter of the through hole 52.

The first end wall 70.1, oriented toward the internal zone Zi, comprises at least one orifice 78 allowing the internal zone Zi and a zone of the cylindrical recess 70 situated between the head 74 of the shutter 54 and the first end wall 70.1 to be connected. The second end wall 70.2, oriented toward the ring 50, comprises a through orifice 80 having a diameter slightly greater than that of the cylindrical body 72 of the shutter 54.

In operation, the cylindrical body 72 passes through the through orifice 80 of the second end wall 70.2. When the shutter 54 occupies the first position, the end face 76 of the cylindrical body 72 of the shutter 54 is away from the seat formed by the second face 50.2 and/or the countersink 50.4 of the ring 50. When the shutter 54 occupies the second position, the end face 76 of the cylindrical body 72 of the shutter 54 is in contact with the seat formed by the second face 50.2 and/or the countersink 50.4 of the ring 50 and blocks the through hole 52.

According to one embodiment, the elastic element 56 is a compression spring inserted on the one hand between the cylindrical body 72 of the shutter 54 and the cylindrical recess 70, and, on the other hand, between the head 74 of the shutter 54 and the second end wall 70.2 of the cylindrical recess 70.

Obviously, the invention is not limited to this embodiment for the support 48, the ring 50, the shutter 54 and the elastic element 56.

According to a feature of the invention, the shutter 54 has a recess 82 emerging at the end face 76 of the cylindrical body 72. This recess 82 is spaced apart from the peripheral edge 76.1 over the entire circumference of the peripheral edge 76.1 in such a way that the end face 76 is in contact with the seat formed by the second face 50.2 and/or the countersink 50.4 of the ring 50, all around the through hole 52, when the shutter 54 occupies the second position corresponding to the closed state of the drainage valve.

According to one configuration, the recess 82 comprises a lateral wall 82.1 that is cylindrical and substantially coaxial to the cylindrical body 72 of the shutter 54.

According to one embodiment, the recess 82 comprises a counterbore 84, away from the end face 76, which has a diameter greater than that of the lateral wall 82.1 of the recess 82. The recess 82 generally has a flat bottom 82.2.

Figures 6A, 6B:
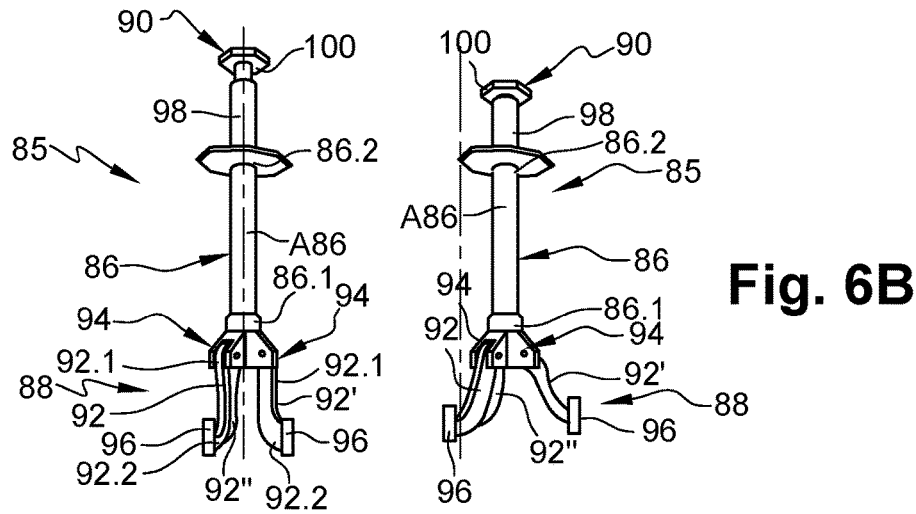
FIGS. 6A and 6B are a side view of a tool for checking the correct operation of the drainage valve visible in FIG. 5, FIG. 6A showing the tool in the retracted state and FIG. 6B showing it in the deployed state.

The invention also proposes a checking tool 85 comprising a stem 86 which extends between first and second ends 86.1, 86.2, at least one expandable element 88 positioned at the first end 86.1 of the stem 86 and configured to occupy a retracted state, as illustrated in FIG. 6A, in which the expandable element 88 can be inserted into the recess 82, and a deployed state, as illustrated in FIG. 6B, in which the expandable element 88 cooperates with the recess 82 and makes it possible to temporarily link the stem 86 and the shutter 54 to displace it in two opposite directions longitudinally and a control 90 configured to switch the expandable element 88 from the retracted state to the deployed state or vice versa.

According to one configuration, the control 90 is positioned at the second end 86.2 of the stem 86.

According to one embodiment, the expandable element 88 comprises at least two arms 92, 92' each having a first end 92.1 linked to the stem 86 by an articulation 94 and a free second end 92.2. According to one configuration, the stem 86 has a longitudinal axis A86 linking its first and second ends 86.1, 86.2. Each articulation 94 comprises a pivoting axis at right angles to the longitudinal axis A86 and spaced apart therefrom, the pivoting axes of the different arms 92, 92' being distributed about the longitudinal axis A86 such that the arms 92, 92' pivot in planes passing through the longitudinal axis A86 and evenly distributed about the latter.

According to one arrangement, the checking tool 85 comprises three arms 92, 92', 92" pivoting in planes forming between them an angle of 120°.

According to one embodiment, each arm 92, 92', 92" comprises, at its free second end 92.2, a block 96 configured to cooperate with the counterbore 84 of the recess 82.

According to one configuration, the stem 86 is hollow. In addition, the control 90 comprises a rod 98 sliding in the stem 86 and having a first end linked to the arms 92, 92', 92" and a grippable second end protruding from the second end 86.2 of the stem 86. The second end of the rod comprises a head 100 to facilitate the manipulation of the rod 98.

Thus, by sliding the rod 98 in the stem 86 in at least one direction, it is possible to switch the arms 92, 92', 92" from the retracted state to the deployed state or vice versa.

According to a configuration visible in FIG. 6A, when the head 100 is away from the stem 86, the arms 92, 92', 92" are in the retracted state. When the head 100 is brought close to the stem 86, as illustrated in FIG. 6B, the aims 92, 92', 92" are in the deployed state.

Obviously, the invention is not limited to these embodiments for the checking tool 85.

As illustrated in FIG. 7, the checking method comprises a step of insertion of the expandable element 88 of the checking tool 85, in the retracted state, into the recess 82 of the shutter 54, then, when the expandable element 88 is positioned in the recess 82 in line with the counterbore 84, a step of activation of the control 90 to switch the expandable element 88 to the deployed state, as illustrated in FIG. 8. The expandable element 88 is then pressed against the counterbore 84. The checking method comprises a step of verification of the operation and/or of unblocking of the drainage valve by displacing the checking tool 85 parallel to the longitudinal direction, in two opposite directions, in order to verify that the shutter 54 is not blocked and, if it is, notably in the open state, to unblock it by forcing it to translate toward the ring 50 using the checking tool 85. After the operation verification and/or unblocking step, the checking method comprises a step of deactivation of the control 90 to switch the expandable element 88 from the deployed state to the retracted state, then a step of removal of the expandable element 88 from the recess 82.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A drainage valve comprising:
    a support configured to be fixed against an inner face of a wall in line with an orifice passing through the wall,
    a ring having a through hole and a seat around the through hole, configured to be positioned at the orifice,
    a shutter comprising an end face delimited by a peripheral edge, wherein the end face is proximate to the seat of the ring, said shutter being movable in a longitudinal direction between a first position in which the end face of the shutter is away from the seat of the ring and a second position in which the end face of the shutter is pressed against the seat of the ring and blocks the through hole,
    an elastic element configured to keep the shutter in the first position as long as a differential between pressures on either side of the wall is below a given threshold,
    wherein the shutter has a cylindrical body and a recess emerging on its through the end face of the shutter, said recess being spaced apart from the peripheral edge over an entire circumference of said peripheral edge, said recess comprising a lateral wall that is cylindrical and substantially coaxial to the cylindrical body of the shutter.

2. The drainage valve as claimed in claim 1, wherein the recess comprises a counterbore, away from the end face, which has a diameter that is both greater than that of the lateral wall of the recess and less than a diameter of the peripheral edge.

3. A tool for checking operation of a drainage valve as claimed in claim 1, wherein the checking tool comprises
    a stem which extends between first and second ends,
    at least one expandable element positioned at the first end of the stem and configured to occupy a retracted state in which the expandable element can be inserted into the recess of the shutter, and a deployed state in which the expandable element cooperates with the recess and makes it possible to temporarily link the stem and the shutter to displace it in two opposite directions longitudinally, and
    a control configured to switch the expandable element from the retracted state to the deployed state or vice versa.

4. The checking tool as claimed in claim 3, wherein the stem has a longitudinal axis linking first and second ends of the stem and wherein the expandable element comprises at least two arms each having a first end linked to the stem by an articulation and a free second end, each articulation comprising a pivoting axis at right angles to the longitudinal axis and spaced apart therefrom, the pivoting axes of the arms being distributed about the longitudinal axis such that the arms pivot in planes passing through the longitudinal axis and evenly distributed about the latter.

5. The checking tool as claimed in claim 4, wherein each arm comprises, at a free second end thereof, a block configured to cooperate with a counterbore of the recess of the shutter.

6. The checking tool as claimed in claim 4, wherein the control is positioned at the second end of the stem.

7. The checking tool as claimed in claim 6, wherein the stem is hollow and wherein the control comprises a rod sliding in the stem and having a first end linked to the arms and a grippable second end protruding from the second end of the stem.

8. The checking tool as claimed in claim 7, wherein the second end of the rod comprises a head.

9. A method for checking operation of a drainage valve as claimed in claim 1 by using a checking tool comprising a stem which extends between first and second ends, at least one expandable element positioned at the first end of the stem and configured to occupy a retracted state in which the expandable element can be inserted into the recess of the shutter and a deployed state in which the expandable element cooperates with the recess and makes it possible to temporarily link the stem and the shutter to displace it in two opposite directions longitudinally, and a control configured to switch the expandable element from the retracted state to the deployed state or vice versa, wherein the checking method comprises the steps of
    inserting the expandable element of the checking tool in the retracted state into the recess of the shutter,
    activating the control to switch the expandable element to the deployed state,
    verifying at least one of the operation or of unblocking of the drainage valve by displacing the checking tool parallel to the longitudinal direction in two opposite directions, deactivating the control to switch the expandable element from the deployed state to the retracted state and then a step of removal of the expandable element from the recess.

* * * * *